INVENTOR.
FRANK V. MINGRONE
DAVID L. MORGAN
HAROLD F. SNIDER
BY Caudn & Caudn
THEIR ATTORNEYS Nov. 29, 1966   F. V. MINGRONE ET AL   3,288,370
FLUID SYSTEM AND CONTROL DEVICE THEREFOR OR THE LIKE
Filed Oct. 8, 1963   6 Sheets-Sheet 4

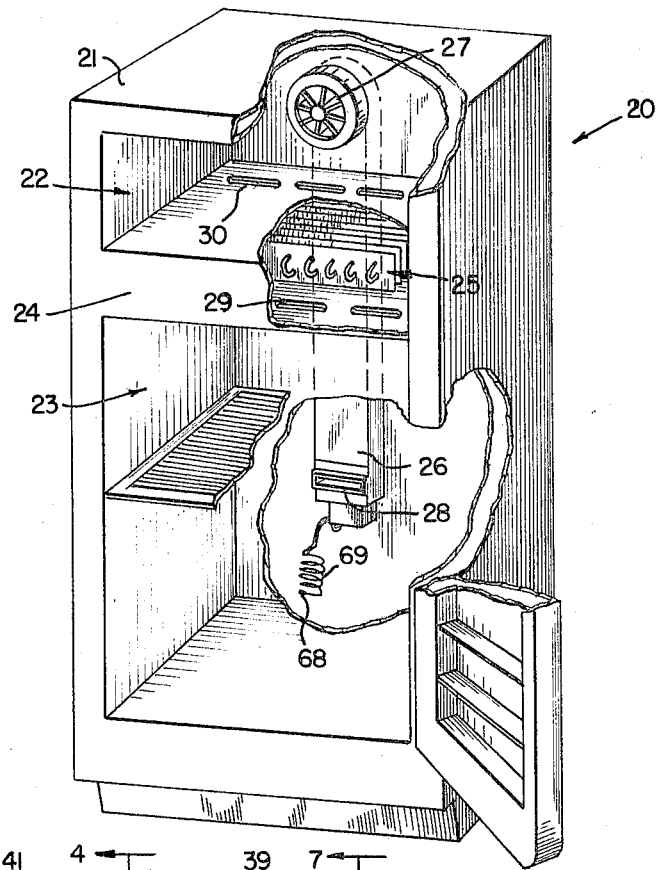
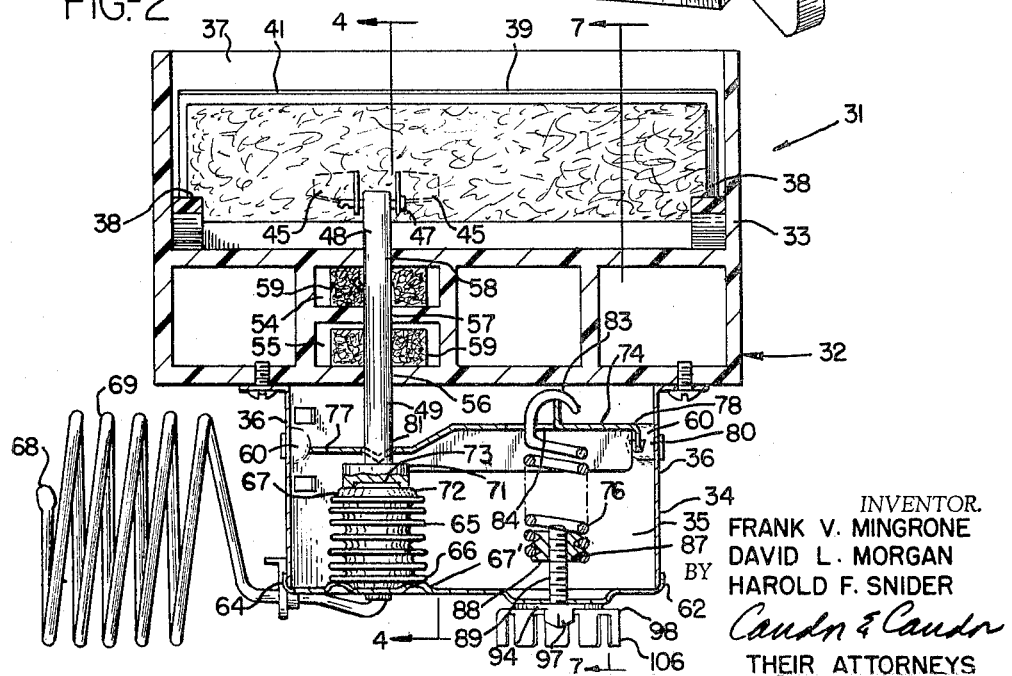
FIG.-1
FIG.-2
INVENTOR.
FRANK V. MINGRONE
DAVID L. MORGAN
HAROLD F. SNIDER
BY
Caudn & Caudn
THEIR ATTORNEYS Nov. 29, 1966  F. V. MINGRONE ETAL  3,288,370
FLUID SYSTEM AND CONTROL DEVICE THEREFOR OR THE LIKE
Filed Oct. 8, 1963  6 Sheets-Sheet 2

INVENTOR.
FRANK V. MINGRONE
DAVID L. MORGAN
HAROLD F. SNIDER
BY
THEIR ATTORNEYS

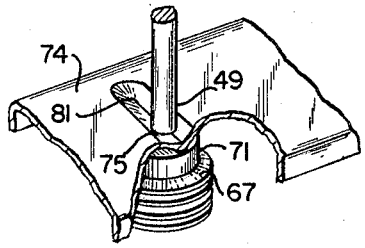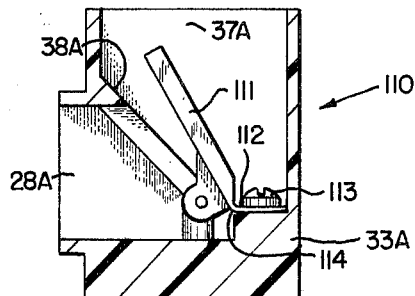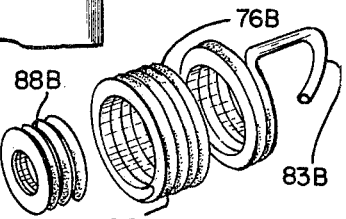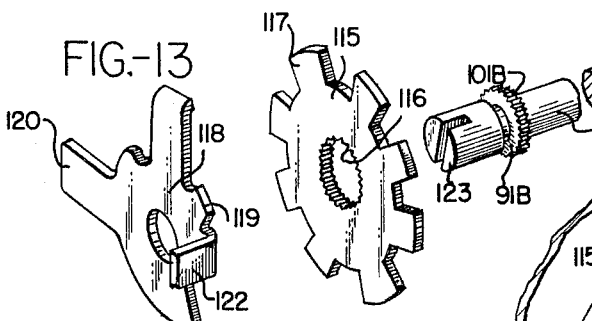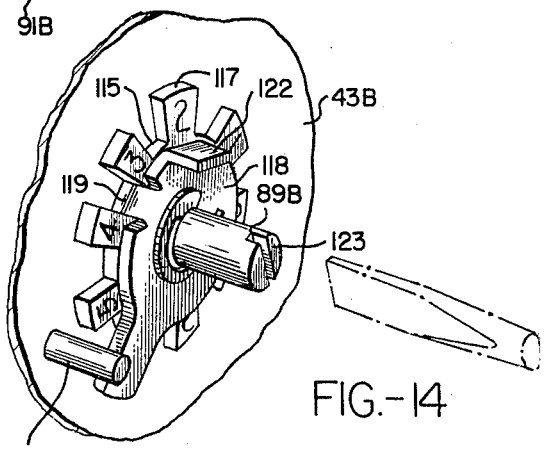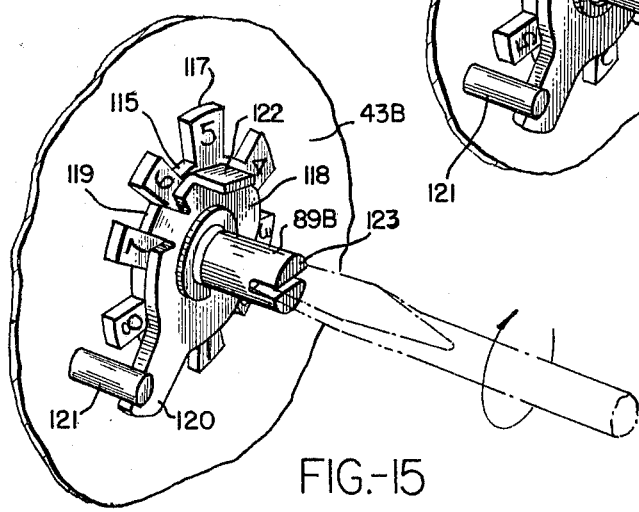
INVENTOR.
FRANK V. MINGRONE
DAVID L. MORGAN
HAROLD F. SNIDER
BY
Cauda & Cauda
THEIR ATTORNEYS Nov. 29, 1966     F. V. MINGRONE ETAL     3,288,370
FLUID SYSTEM AND CONTROL DEVICE THEREFOR OR THE LIKE
Filed Oct. 8, 1963     6 Sheets-Sheet 6

*INVENTOR.*
FRANK V. MINGRONE
DAVID L. MORGAN
HAROLD F. SNIDER
BY

*THEIR ATTORNEYS*

United States Patent Office 3,288,370
Patented Nov. 29, 1966

3,288,370
FLUID SYSTEM AND CONTROL DEVICE THEREFOR OR THE LIKE
Frank V. Mingrone, Milford, David Luke Morgan, Shelton, and Harold F. Snider, Orange, Conn., assignors to Robertshaw Controls Company, Richmond, Va., a corporation of Delaware
Filed Oct. 8, 1963, Ser. No. 314,784
15 Claims. (Cl. 236—49)

This invention relates to an improved fluid control system for a domestic refrigerator or the like as well as to an improved control device for such a system or the like.

It is well known that it is desirous to provide air circulating means between the food freezer compartment of a domestic refrigerator or the like and a conventional non-frozen food storage compartment thereof so that the cold air from the frozen food compartment can be circulated through the other food compartment to maintain the same at the desired temperature.

For example, suitable valve means are disposed in the above described air circulating means to control the flow of air therethrough in response to the temperature condition of the non-frozen food storage compartment. In particular, should the temperature of the non-frozen food storage compartment rise above a selected temperature, a suitable valve member opens a desired amount to let more air circulate from the frozen food compartment into the non-frozen food compartment to reduce the temperature thereof to the desired temperature. When the temperature in the non-frozen food compartment falls below the selected temperature, the condition responsive means closes the valve member to temporarily prevent the circulation of air between the frozen food compartment and the non-frozen food compartment.

Thus, it can be seen that the regulation of the valve member in the air circulation means of the domestic refrigerator or the like maintains the nonfrozen food compartment thereof at the desired temperature.

According to the teachings of this invention, an improved control device is provided for controlling the operation of a valve member or the like for use in such a domestic refrigerator or the like.

Accordingly, it is an object of this invention to provide an improved fluid control system having one or more of the novel features set forth above or hereinafter shown or described.

Another object of this invention is to provide an improved control device for such a fluid system or the like, the control device of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a broken-away perspective view illustrating a typical domestic refrigerator or the like incorporating the features of this invention.

FIGURE 2 is an enlarged, cross-sectional view illustrating the improved control device of this invention for the domestic refrigerator illustrated in FIGURE 1.

FIGURE 11 is a fragmentary perspective view illustrating the attachment of the lever of this invention with the condition responsive means of this invention.

FIGURE 12 is a fragmentary view similar to FIGURE 4 and illustrates another embodiment of this invention.

FIGURE 13 is an exploded perspective view illustrating another embodiment of the range spring adjustment means of this invention.

FIGURES 14 and 15 are respectively fragmentary perspective views illustrating the method for adjusting the range spring means illustrated in FIGURE 13.

Figure 3:
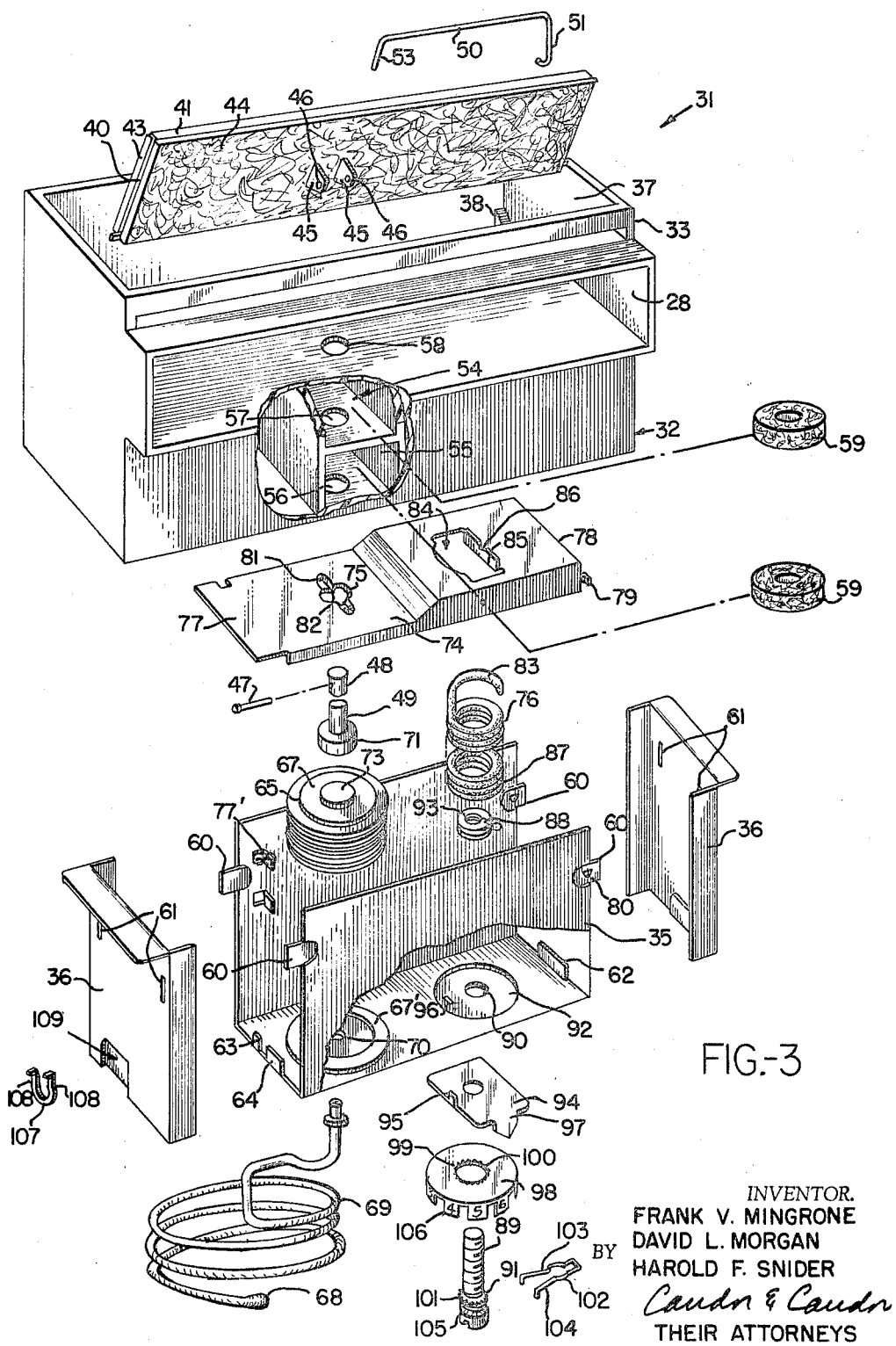
FIGURE 3 is an exploded perspective view of the various parts forming the control device illustrated in FIGURE 1.

While the various features of this invention are hereinafter described and illustrated as being particularly adaptable for a domestic refrigerator or the like, it is to be understood that the various features of this invention can be utilized singly or in any combination thereof to provide a control device for other desired structure.

Therefore, this invention is not to be limited to only the embodiments illustrated in the drawings, because the drawings are merely utilized to illustrate one of the wide variety of uses of this invention.

Referring now to FIGURE 1, a conventional domestic refrigerator or the like is generally indicated by the reference numeral 20 and comprises a housing means 21 divided into a frozen food compartment 22 and a non-frozen food compartment 23 by a suitable wall means 24 housing a refrigerant evaporator 25 therein.

A suitable air circulating means 26 is provided to receive cold air in an inlet 27 thereof at the frozen food compartment 22 and to circulate the same, by a suitable fan or blower, to the non-frozen food compartment 23 at an outlet 28 thereof whereby the air in the non-frozen food compartment 23 can be circulated upwardly and through inlets 29 in the wall means 24 over the evaporator 25 and out through outlets 30 in the wall means 24 back to the frozen food compartment 22.

Thus, it can be seen that as the air is circulated from the frozen food compartment 22 to the non-frozen food compartment 23, the cold air entering the non-frozen compartment 23 tends to lower the temperature of the compartment 23.

However, suitable valve means are disposed in the air circulating means 26 in a manner hereinafter described to regulate the flow of air through the air circulating means 26 to maintain the temperature in the non-frozen food compartment 23 at the desired temperature.

For example, should the temperature in the non-frozen food compartment 23 exceed a predetermined temperature, the valve means in the air circulation means 26 opens to permit air to circulate from the compartment 22 to the compartment 23 to lower the temperature of the compartment 23.

However, when the temperature in the non-frozen food compartment 23 falls below the selected temperature, the valve means in the air circulation means 26 closes to prevent the circulation of air from the compartment 22 to the compartment 23 until the temperature of the compartment 23 again rises above the selected temperature.

Thus, by controlling the position of the valve means in the air circulation means 26 in the manner according to the teachings of this invention, the temperature in the compartment 23 can be maintained at the selected temperature by means of condition responsive means in response to the temperature of the compartment 23 in a manner hereinafter described.

The particular control device for controlling the air circulation means of the refrigerator 20 previously described is generally indicated by the reference numeral 31 in FIGURES 2 and 3 and will now be described.

As illustrated in FIGURES 2 and 3, the control device 31 includes a housing means 32 formed of a plastic housing 33 and a metallic housing member 34 interconnected thereto, the metallic housing 34 comprising a substantially U-shaped housing member 35 having the opposed open ends thereof respectively closed by like housing members 36 in a manner hereinafter described.

Figure 4:
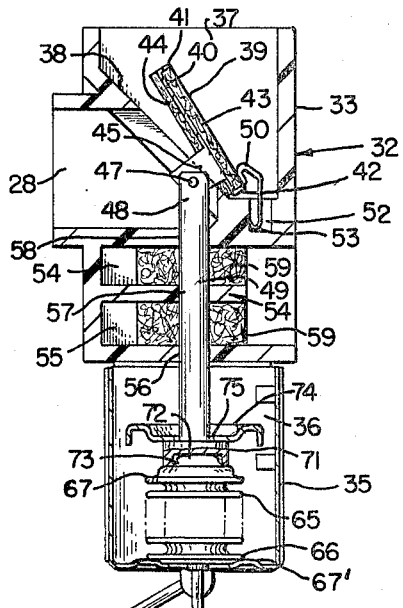
FIGURE 4 is an end cross-sectional view taken on line 4—4 of FIGURE 2.

As illustrated in FIGURES 3 and 4, the housing 33 has an inlet 37 interconnected to the outlet 28 previously described by a valve seat 38 opened and closed by a valve member 39 of this invention in a manner hereinafter described.

The valve member 39 comprises a metallic plate 40 having outwardly directed flanges 41 and 42.

The opposed sides of the metal plate 39 are respectively covered by foam rubber pads 43 and 44 to tend to prevent the valve member 39 from sticking in its closed position and having frost accumulate thereon.

A pair of parallel ears 45 are respectively stamped from the plate 40 of the valve member 39 and extend at right angles relative thereto, the ears 45 having suitable apertures 46 passing therethrough to telescopically receive a pivot pin 47 which pivotally interconnects an end 48 of an actuating rod 49 thereto for a purpose hereinafter described.

A bent wire spring 50 is not only utilized to substantially hinge the valve member 39 to the housing means 32, but is also utilized to tend to continuously urge the valve member 39 to its valve open position, the spring 50 having one leg 51 thereof received and secured in a closed bore 52 of the housing means 33 in the manner illustrated in FIGURE 4, while the other leg 53 thereof is received against and secured to the inside surface of the flange 42 of the valve member 39.

Thus, the spring member 50 continuously urges the valve member 39 to pivot in a clockwise direction in FIGURE 4 to a valve open position thereof.

Figure 5:
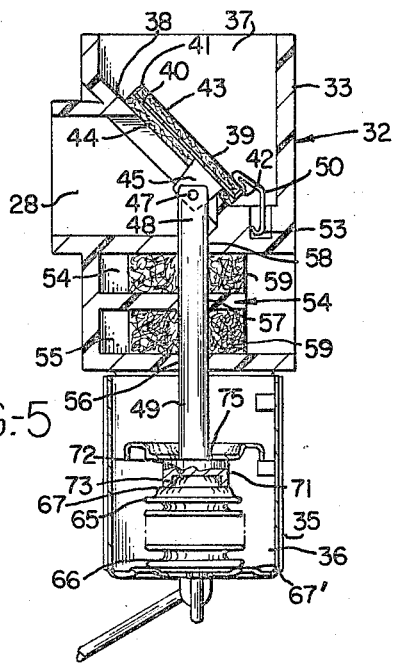
FIGURE 5 is a view similar to FIGURE 4 and illustrates the valve member thereof in another operating position.

However, downward movement of the actuator 49 from the position illustrated in FIGURE 4 to the position illustrated in FIGURE 5 effectively closes the valve member 39 against the valve seat 38 in opposition to the spring means 50 for a purpose hereinafter described.

The housing member 33 of the housing means 32 is so constructed and arranged that the same defines a plurality of compartments 54 and 55 between the valve member 39 and the housing means 34, the actuator 49 passing through such compartments 54 and 55 to the valve member 39 by means of suitable apertures 56, 57 and 58 formed in the housing member 32 in the manner illustrated in FIGURES 2 and 3.

However, in order to substantially insulate the actuator 49 from the temperature of the fluid passing through the valve seat 38, suitable felt discs 59 are telescopically disposed on the actuator 49 and are respectively received in the compartments 54 and 55 in the manner illustrated in the drawings.

The metallic housing means 34 is so constructed and arranged that the housing member 35 has a plurality of ears 60 pressed inwardly therefrom and extending beyond the same to be respectively received in slots 61 of the end members 36 after the member 35 has the flanges 62, 63 and 64 thereof respectively received outboard of the side members 36 in the manner illustrated in FIGURE 2, the ears 60 subsequently being peened to secure the end plates 36 to the member 35.

A bellows construction 65 is disposed in the housing means 34 and has one end 66 thereof secured to a bossment 67' of the housing member 35 in a manner hereinafter described whereby the other end 67 of the bellows construction 65 is adapted to move upwardly and downwardly in the drawings, the interior of the bellows construction 65 being interconnected to a temperature sensing bulb 68 by a conduit means 69 interconnected thereto and passing through a suitable aperture 70 formed in the housing member 35.

The actuator rod 49 has an enlarged button shaped end 71 provided with a recess 72 in the lower side thereof which is adapted to receive a substantially cylindrical end portion 73 on the movable wall 67 of the bellows construction 65.

The end 71 of the actuator 49 is continuously held in engagement with the bellows construction 65 by a pivotally mounted lever 74 of this invention, the lever 74 having an aperture 75 passing therethrough and telescopically receiving the actuator 49 so that the lever 74 will bear against the enlarged portion 71 of the actuator 49 and hold the same into engagement with the movable wall 67 of the bellows construction 65 by the force of a tension spring means 76 of this invention in a manner hereinafter described.

Figure 10:
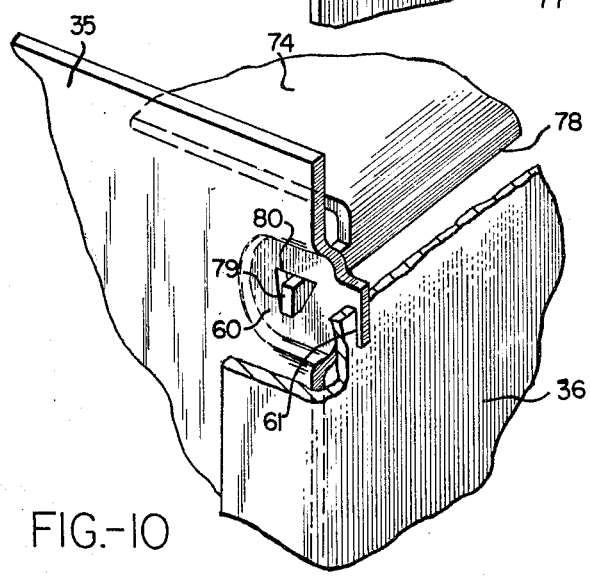
FIGURE 10 is a view similar to FIGURE 9 and illustrates the pivotal connection of the lever of the control device of this invention.

The lever 74 has opposed ends 77 and 78, the end 78 having outwardly directed tangs 79 respectively received in slots 80 formed in the left hand ears 60 of the housing member 65 in the manner illustrated in FIGURE 10 whereby the lever 74 is adapted to be pivotally mounted in the housing means 32.

The intermediate portion of the lever 74 is provided with a longitudinal dimple 81 to define a downwardly facing substantially V-shaped boss 82 which will engage the enlarged end 71 of the actuator 49 on opposite sides thereof to give more or less line contact between the lever 74 and the actuator 49 so that regardless of the pivotal position of the lever 74, the force thereof being applied against the bellows construction 65 is substantially uniform.

However, upward and downward pivotal movement of the lever 74 is limited by stop means 77' pressed from the housing member 35 and respectively engageable with the end 77 of the lever.

The range spring 76 has a hook-shaped end 83 adapted to be telescopically received through a slot 84 provided in the lever 74 and be hooked around a flange 85 thereof at a recess 86 so that the spring 76 will continuously tend to urge the lever 74 in a counterclockwise direction in FIGURE 2 to provide a retarding force against the movable end 67 of the bellows construction 65 tending to move upwardly upon an expansion of the fluid therein.

The other end 87 of the spring 76 is interconnected to an internally threaded member 88 disposed therein and secured thereto so as to be non-rotatable relative to the spring 76.

Figure 7:
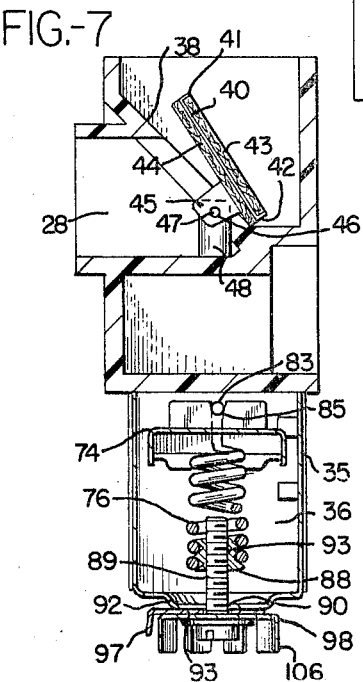
FIGURE 7 is a cross-sectional view taken substantially on line 7—7 of FIGURE 2.
Figure 8:
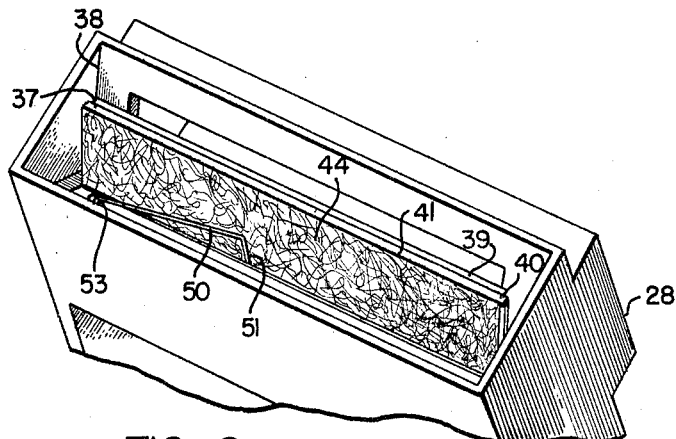
FIGURE 8 is a fragmentary perspective view illustrating the valve member portion of the control device of FIGURE 2.
Figure 9:
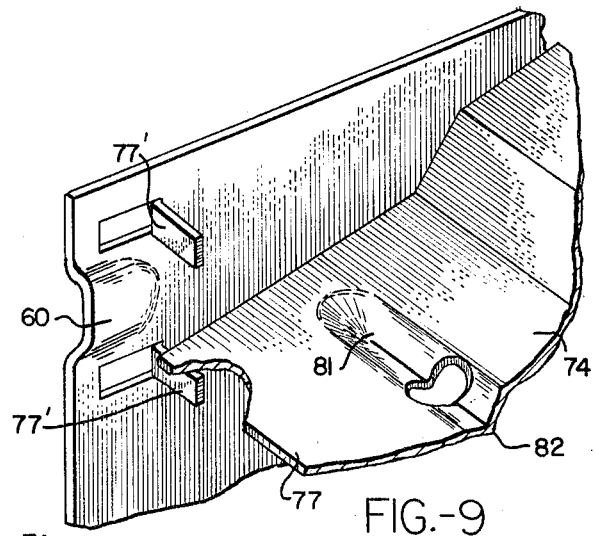
FIGURE 9 is an enlarged, fragmentary, perspective view illustrating the stop means of this invention for limiting movement of the pivotally mounted lever of the control device of FIGURE 2.

A threaded adjusting member 89 is rotatably carried by the housing means 34 by having the shank portion thereof passing through a suitable aperture 90 formed in the housing member 35 until an enlarged portion 91 thereof abuts the under surface of the housing member 35 at an outwardly dimpled embossment 92 thereof as illustrated in FIGURES 2 and 7.

The shank portion of the adjusting member 89 is threadedly received in the threaded bore 93 of the threaded member 88 to effectively interconnect the end 87 of the spring 76 to the housing means 34.

Thus, it can be seen that upon rotation of the threaded member 89 in the proper direction, the end 87 of the spring 76 can be moved downwardly from the position illustrated in FIGURE 2 to cause the spring 76 to apply a greater force tending to retard upward movement of the movable end 76 of the bellows construction 65.

Conversely, upon rotation of the adjusting member 89 in the opposite direction, the end 87 of the spring 76 can be moved upwardly from the position illustrated in FIGURE 2 to reduce the tension force of the spring 76 tending to retard upward movement of the movable end 67 of the bellows construction 65.

Thus, it can be seen that the threaded member 89 can be utilized to adjust the bellows construction 65 in such a manner that the same will maintain a selected temperature in the compartment 23 of the refrigerator 20 previously described.

A plate 94 is telescopically received on the shank portion of the threaded portion 89 and is disposed between the enlarged portion 91 thereof and the outside surface of the embossment 92 of the housing member 35, the plate 94 being held from rotational movement relative to the housing member 35 by having an integral tang 95 thereof received in a slot 96 of the housing member 35.

The plate 94 has a reversely bent tang 97 to provide an indicating means for the adjustment of the adjusting member 89 in a manner now to be described.

An indicating member or plate 98 is provided and has an aperture 99 passing therethrough to telescopically receive the enlarged outer end portion of the adjusting member 89, the bore 99 in the indicating member 98 having internal gear teeth 100 which cooperate with external gear teeth 101 on the enlarged portion 91 of the adjusting member 89 to spline the same together so that rotation of the indicating member 98 causes like rotation of the adjusting member 89.

Figure 6:
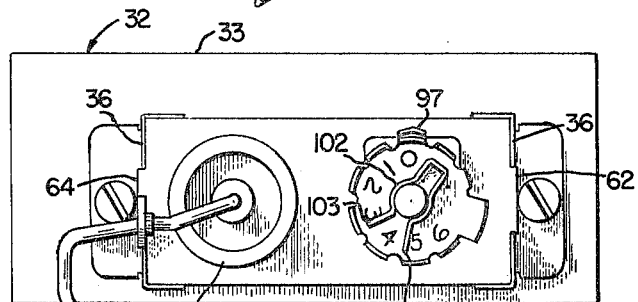
FIGURE 6 is a bottom view of the control device illustrated in FIGURE 2.

The indicating member 98 is held on the adjusting member 89 by a spring clip 102 having the opposed legs 103 and 104 thereof respectively received in a recess 105 on the adjusting member 89 in the manner illustrated in FIGURE 6.

The indicating member 98 has a plurality of outwardly directed tangs 106 provided thereon and each indicates an altitude reading. For example, when the tab 106 corresponding to the zero position of the indicating member 98 is adjacent to the tang 97 of the plate 94, the control device 31 is set for a predetermined temperature sensing at sea level.

However, should the bellows 65 be so adjusted by the adjusting member 89 that the same will maintain the temperature in the compartment 23 of the refrigerator 20 at approximately 35° when at sea level and the same is to be subsequently utilized at an altitude of 5,000 feet above sea level, the indicating member 98 is turned from the position illustrated in FIGURE 6 until the tang 106 carrying the numeral 5 is disposed adjacent the indicator 97 of the plate 94 whereby the control device 31 will maintain the compartment 23 at the selected 35° when the refrigerator 20 is at 5,000 feet above sea level.

Thus, it can be seen that the adjusting member 89 not only adjusts the temperature for the control device 20, but also compensates for altitude variations of the condition responsive means 65.

For example, when the control device 31 is initially formed, the indicator or adjustment member 98 is removed therefrom and the adjusting member 89 is adjusted at the particular altitude, say 1,000 feet above sea level, to cause the bellows construction 65 to open the valve member 39 when the same senses a temperature above 35°.

With the adjusting member 89 now disposed in this position, the indicating member 98 is placed thereon in such a manner that the tang 106 bearing the numeral 1 is disposed adjacent the tang 97 of the plate 94 whereby regardless of where the refrigerator 20 is shipped, the same can control the temperature of the compartment 23 to maintain a temperature of 35° therein as long as the indicating member 98 is set at the particular altitude where the refrigerator 20 is being utilized.

Further, even though the control device 31 has been set in the above manner and is being utilized by the user so as to maintain the compartment 23 at the desired temperature of 35° at the particular altitude provided by the indicating wheel 98, the user can raise or lower the temperature of the compartment 23 by merely rotating the screw 89 in the desired direction by the indicator 98 to cause the bellows construction 65 to maintain the temperature in the compartment 23 at another selected temperature.

While the conduit 69 of the bellows construction 65 can be utilized in any suitable manner, the same is adapted to be clipped to the housing means 34 so as to prevent the same from being pulled out of the aperture 70 of the housing member 35 even though the same can be silver soldered thereto or the like.

For example, a U-shaped clip 107 can be utilized to encircle the conduit 69 and have the legs 108 thereof deformed behind the tang 63 of the housing member 65 at an inset portion 109 of the respective end member 36 in the manner illustrated in FIGURES 2 and 3.

Therefore, it can be seen that not only does this invention provide an improved fluid circulating system or the like, but this invention also provides an improved control device for such a fluid system or the like.

However, while only one embodiment of the control device of this invention has been previously described, it is to be understood that various variations can be made therein and the same would still fall within the scope of the appended claims.

For example, reference is made to FIGURE 12 wherein another control device of this invention is generally indicated by the reference numeral 110 and parts thereof similar to the control device 31 previously described are indicated by like reference numerals followed by the reference letter A.

As illustrated in FIGURE 12, the control device 110 includes the upper housing means 33A having the inlet 37A and outlet 28A interconnected together by the valve seat 38A.

However, the valve member 111 of the control device 110 is formed of plastic material, such as polypropylene and is interconnected to the actuating shaft 49A in the manner previously described.

The valve member 111 has an integral narrow flat portion 112 extending therefrom and secured to the housing member 33A by fastening members 113 whereby the integral connection 114 between the thickened portion of the valve member 111 and the fastening members 113 comprises hinge means for permitting movement of the valve member 111 between its opened and closed positions.

Another means for adjusting the range spring 76 of the control device 31 is illustrated in FIGURES 13–15 wherein parts thereof similar to the control device 31 are indicated by like reference numerals followed by the reference letter B.

As illustrated in FIGURE 13, the internally threaded member 88B is adapted to be inserted in the end 87B of the range spring 76B and threadedly receives the threaded portion of the adjusting member 89B in the manner previously described.

However, an indicating wheel 115 is telescopically received on the adjusting member 89B and has an internally geared aperture 116 adapted to cooperate with the gear portion 101B of the enlarged portion 91B of the adjusting member 89B so that the same will rotate in unison therewith, the indicating wheel 115 having a plurality of upwardly directed tangs 117 to indicate various positions of altitude.

Another member 118 is telescopically disposed on the adjusting member 89B outboard of the indicating wheel 115 and is rotatable relative to the adjusting member 89B.

However, the member 118 has a tang 119 adapted to be bent between adjacent tangs 117 of the indicating wheel 115 in the manner illustrated in FIGURE 14 to interconnect the same together so that upon movement of the member 118 by means of a handle portion 120 thereof in any direction, the same will cause like rotation of the shaft 89B.

As illustrated in FIGURES 14 and 15, the housing means 43B has an outwardly directed pin 121 to be engaged by the handle portion 120 of the member 118 to limit rotation of the adjusting member 89B in both its clockwise and counterclockwise direction.

Should the adjusting means illustrated in FIGURES 13-15 be set for a particular altitude and it is desired to adjust the same to another altitude, the same can be adjusted in the following manner.

For example, should an outwardly directed tang 122 of the member 118 be disposed adjacent the tang 117 of the indicating wheel 115 which registers 2,000 feet above sea level as illustrated in FIGURE 14 and it is desired that the same be adjusted for 5,000 feet above sea level, the member 118 is moved in a clockwise direction until the handle portion 120 thereof bears against the tang 121.

Thereafter, the tang 119 of the member 118 is disengaged between adjacent tangs 117 in the manner illustrated in FIGURE 15 and a suitable screwdriver or the like is inserted in the bifurcated end 123 of the threaded member 89B and the same is rotated in a counterclockwise direction until the tang 115 of the indicating wheel 115 bearing the numeral 5 is disposed adjacent the tang 122 of the member 118.

At this time, the tang 119 is rebent between adjacent tangs 117 of the gear wheel 115 whereby the control device has now been adjusted for use at 5,000 feet above sea level for the purpose previously described.

Figure 16:
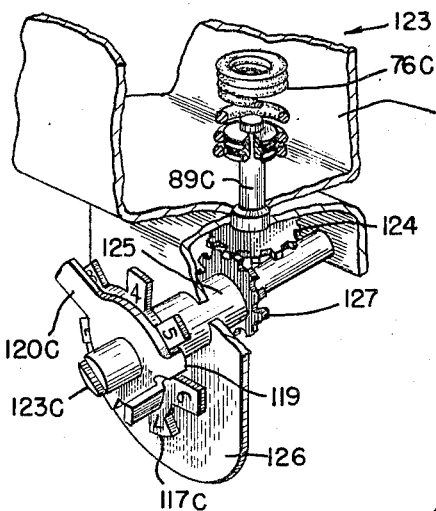
FIGURES 16 and 17 are respectively fragmentary perspective views illustrating other adjustment means of this invention.

Another embodiment of this invention is generally indicated by the reference numeral 123 in FIGURE 16 and parts thereof similar to the control device 31 illustrated in FIGURE 2 are indicated by like reference numerals followed by the reference letter C.

As illustrated in FIGURE 16, the adjusting member 89C is interconnected to the range spring 76C in the manner previously described. However, the adjusting member 89C has a gear wheel 124 on the outer end thereof whereby the same is adapted to be rotatable relative to the housing means 32C and be adjusted by an adjusting means disposed at right angles relative thereto.

For example, a shaft 125 is rotatably carried by a bracket 126 and has a gear wheel 127 disposed thereon and adapted to mesh with the gear wheel 124 of the adjusting member 89C even though the adjusting member 89C and the shaft 125 are disposed at right angles relative thereto.

The shaft 125 carries the altitude adjusting means similar to the altitude adjusting means of FIGURES 13-15 to be utilized in the same manner whereby it can be seen that the means for adjusting the adjusting shaft 89 of this invention can be varied and still fall within the scope of this invention.

Figure 17:
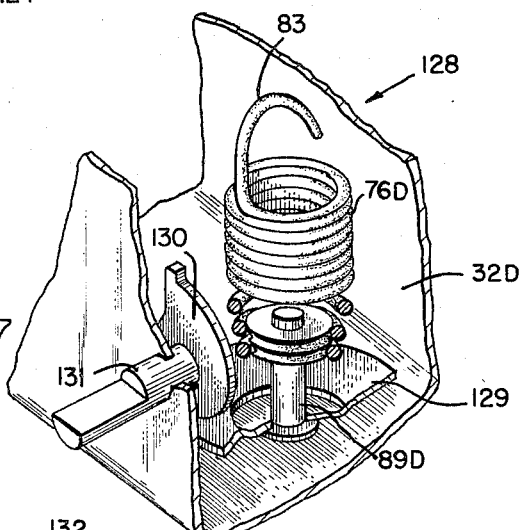

Similarly, reference is made to FIGURE 17 wherein another embodiment of this invention is generally indicated by the reference numeral 128 and parts thereof similar to the control device 31 previously described are indicated by like reference numerals followed by the reference letter D.

As illustrated in FIGURE 17, the adjusting member 89D is interconnected to the range spring 76D in the same manner as the adjusting member 89 previously described. However, the adjusting member 89D is not rotatably carried by the housing means 32D and has a disc-shaped member 129 on the outer end thereof which is urged into engagement with a cam wheel 130 rotatably carried by the housing means 32D by a rotatably mounted shaft 131.

Thus, by rotating the shaft 131, the cam wheel 130 cams the disc 129 upwardly or downwardly whereby the tension force of the range spring 76D is varied to carry the temperature setting of the control device 128 in the manner previously described, the axial movement of the adjustment member 89D being guided by suitable frame means (not shown) to prevent tilting of the disc member 129 by the cam wheel 130.

It has been found that when the control device 31 of this invention is utilized in the domestic refrigerator 20 previously described, sometimes the cold air internally of the refrigerator 20 tends to cool the bellows construction 65 to such an extent that the bellows construction 65 does not function accurately in response to the temperature sensed by the bulb 68 for the purpose previously described.

Therefore, a suitable heater means can be disposed adjacent the bellows construction 65 to tend to maintain the same at a constant temperature regardless of the temperature of the fluid passing through the control device 31 in the manner previously described.

Figure 18:
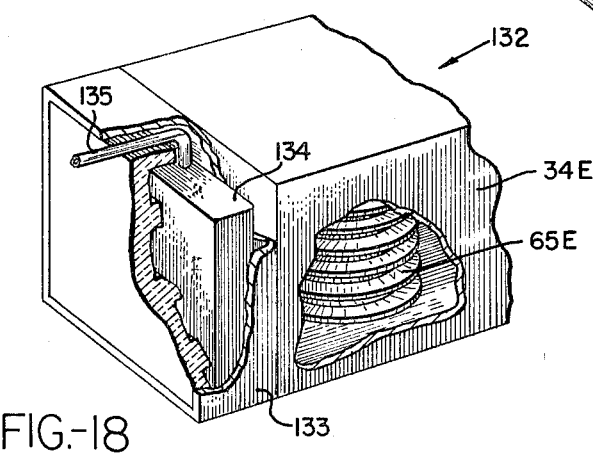
FIGURE 18 is a fragmentary perspective view illustrating still another embodiment of the control device of this invention.

For example, reference is made to FIGURE 18 wherein another embodiment of this invention is generally indicated by the reference numeral 132 and parts thereof similar to the control device 31 are indicated by like reference numerals followed by the reference letter E.

As illustrated in FIGURE 18, the bellows construction 65E is disposed in the housing means 34E in the manner previously described. However, an additional housing means 133 is disposed against the housing means 34E and adjacent the bellows construction 65E, the housing 133 containing an electrical heater means 134 adapted to be interconnected to a suitable power source by a cable means 135.

Thus, it can be seen that the heater means 134 can maintain the temperature surrounding the bellows construction 65E at a constant temperature regardless of the temperature of the fluid passing the control device 31.

Therefore, it can be seen that many variations can be made in the control device of this invention while all of the variations still fall within the scope of the appended claims.

Accordingly, not only does this invention provide an improved fluid circulating system or the like, but also this invention provides an improved control device for such a fluid circulating system or the like.

While the form of the invention now preferred has been disclosed as required by the statutes, other forms may be used, all coming within the scope of the claims which follow.

What is claimed is:

1. In combination, a condition responsive means having moving means movable in response to said condition, an actuator to be moved by said moving means, a pivotally mounted lever having a portion engageable with said actuator, said actuator having an end separate from and engageable with said moving means, first means operatively interconnected to said actuator to tend to move said actuator away from said moving means, and spring means operatively interconnected to said lever to retard movement of said moving means in one direction and to tend to hold said end of said actuator against said moving means in opposition to the force of said first means so that said actuator tends to follow the movement of said moving means.

2. A combination as set forth in claim 1 and including means to adjust the retarding force of said spring means.

3. A combination as set forth in claim 1 and including means to adjust the retarding force of said spring means to compensate for altitude variations on said condition responsive means.

4. In combination, a housing having an inlet and an outlet interconnected together by a valve seat, a movable valve member for opening and closing said valve seat, a condition responsive means disposed in said housing and having moving means movable in response to said condition, an actuator to be moved by said moving means and being operatively interconnected to said valve member, a lever pivotally mounted to said housing and having a portion engageable with said actuator, said actuator having an end separate from and engageable with said moving means, first means operatively interconnected to said actuator to tend to move said actuator away from said moving means, and spring means operatively interconnected to said lever to retard movement of said moving means in one direction and to tend to hold said end of said actuator against said moving means in opposition to the force of said first means so that said actuator tends to follow the movement of said moving means.

5. In combination, a condition responsive means having moving means movable in response to said condition, an actuator to be moved by said moving means, a pivotally mounted lever having a portion engageable with said actuator, said actuator having an end separate from and engageable with said moving means, first means operatively interconnected to said actuator to tend to move said actuator away from said moving means, spring means having one end operatively interconnected to said lever to retard movement of said moving means in one direction and to tend to hold said end of said actuator against said moving means in opposition to the force of said first means so that said actuator tends to follow the movement of said moving means, and adjustable means operatively interconnected to the other end of said spring means to vary the retarding force of said spring means.

6. A combination as set forth in claim 5 wherein said spring means comprises a coiled construction and wherein said adjustable means includes an internally threaded member disposed in said other end of said coiled construction and threadedly receiving a threaded adjusting member whereby rotation of said threaded adjusting member varies the tension force of said spring means.

7. In combination, a housing, a condition responsive means disposed in said housing and having moving means movable in response to said condition, an actuator to be moved by said moving means, a lever pivotally mounted in said housing and having a portion engageable with said actuator, said actuator having an end separated from and engageable with said moving means, first means operatively interconnected to said actuator to tend to move said actuator away from said moving means, spring means disposed in said housing and having one end operatively interconnected to said lever intermediate said moving means and the pivot means of said lever to retard movement of said moving means in one direction by the tension force of said spring means and to tend to hold said end of said actuator against said moving means in opposition to the force of said first means so that said actuator tends to follow the movement of said moving means, and adjusting means operatively interconnected to the other end of said spring means to move said other end toward or away from said lever to vary said tension force.

8. A combination as set forth in claim 7 wherein said adjusting means includes an internally threaded member connected to said other end of said spring means and a threaded adjusting member rotatably carried by said housing and threadedly received in said internally threaded member and wherein said threaded adjusting member carries a gear and wherein a shaft is rotatably carried by said housing and carries another gear disposed in meshing relation with said first-named gear whereby rotation of said shaft varies the tension force of said spring.

9. A combination as set forth in claim 7 wherein said adjusting means includes a member interconnected to said other end of said spring means and a cam means rotatably carried by said housing and engageable with said last-named member to vary the tension force of said spring means upon rotation of said cam means.

10. In combination, a housing, a condition responsive means disposed in said housing and having moving means movable in response to said condition, an actuator to be moved by said moving means, a lever having one end thereof pivotally mounted to said housing and having the other end thereof engageable with said actuator, said actuator having an end separate from and engageable with said moving means, first means operatively interconnected to said actuator to tend to move said actuator away from said moving means, spring means operatively interconnected to said lever intermediate said ends thereof to retard movement of said moving means in one direction and to tend to hold said end of said actuator against said moving means in opposition to the force of said first means so that said actuator tends to follow the movement of said moving means, and stop means carried by said housing to limit pivotal movement of said lever in opposite directions.

11. In combination, a housing, a condition responsive means disposed in said housing and having moving means movable in response to said condition, an actuator having an enlarged end, said actuator having said end separate from and engageable with said moving means, first means operatively interconnected to said actuator to tend to move said actuator away from said moving means, a lever pivotally mounted to said housing and having a portion thereof engaging said enlarged end of said actuator on the side thereof opposed to said moving means, and spring means operatively interconnected to said lever to retard movement of said moving means in one direction and to tend to hold said end of said actuator against said moving means in opposition to the force of said first means so that said actuator tends to follow the movement of said moving means.

12. A combination as set forth in claim 11 wherein said portion of said lever has an aperture passing therethrough and through which said actuator is telescopically received.

13. A combination as set forth in claim 11 wherein said portion of said lever has friction reducing boss means engaging said enlarged end of said actuator.

14. A combination as set forth in claim 2 wherein said last-named means comprises a rotatably mounted shaft operatively interconnected to said spring means and having a keyed portion, and a handle member detachably keyed to said keyed portion of said shaft.

15. A combination as set forth in claim 2 wherein said last-named means includes a rotatably mounted shaft operatively interconnected to said spring means and having a keyed portion, a first member keyed to said keyed portion of said shaft, and a second member mounted for rotation on said shaft and having means for detachably interconnecting said second member to said first member to move in unison therewith.

References Cited by the Examiner

UNITED STATES PATENTS

| | | | |
|---|---|---|---|
| 251,591 | 12/1881 | Jaeger | 16—180 |
| 998,767 | 7/1911 | Fulton | 236—38 |
| 1,358,193 | 11/1920 | Fulton | 236—49 |
| 1,803,708 | 5/1931 | Jaeger | 236—42 |
| 2,012,527 | 8/1935 | Batchelder. | |
| 2,032,358 | 3/1936 | Folsom et al. | 73—362.5 |
| 2,055,280 | 9/1936 | Dodson. | |
| 2,107,809 | 2/1938 | Warner | 236—49 |
| 2,338,563 | 1/1944 | Andersson | 236—68 |
| 2,467,427 | 4/1949 | Green | 62—187 |
| 2,526,874 | 10/1950 | Jones | 62—186 |
| 2,537,315 | 1/1951 | Newton | 236—99 X |
| 2,625,017 | 1/1953 | Tucker | 62—187 |
| 2,626,106 | 1/1953 | Voss | 236—49 |
| 2,676,609 | 4/1954 | Pfarrer | 251—61 X |
| 2,907,180 | 10/1959 | Mann | 62—187 |
| 3,048,985 | 8/1962 | Long | 236—68 X |
| 3,121,338 | 2/1964 | Payne | 200—140 X |
| 3,156,413 | 11/1964 | Porland | 236—42 |
| 3,177,321 | 4/1965 | Grimshaw | 200—140 |

ALDEN D. STEWART, *Primary Examiner.*

WILLIAM J. WYE, *Examiner.*